Dec. 6, 1949 — C. H. LYSLE ET AL — 2,490,450
GLASS-SHAPING MOLD
Filed May 9, 1944
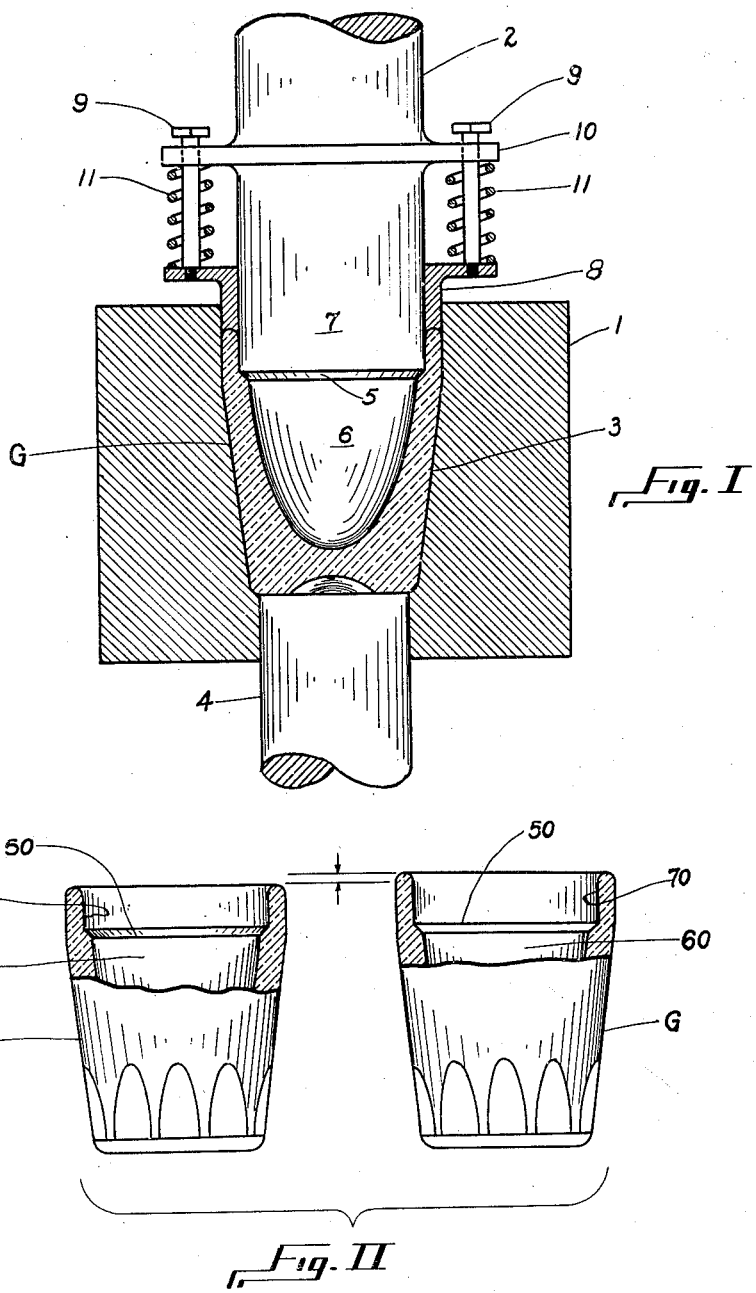
INVENTORS
Charles H. Lysle
James M. Guthrie
BY Christy, Parmelee and Strickland
attorneys Patented Dec. 6, 1949

2,490,450

UNITED STATES PATENT OFFICE 2,490,450

GLASS-SHAPING MOLD

Charles H. Lysle, Pittsburgh, and James M. Guthrie, Allison Park, Pa.

Application May 9, 1944, Serial No. 534,738

2 Claims. (Cl. 49—72)

Our invention relates to the production of glass articles. It particularly relates to a glass vessel that is used both as a measure for liquid and as a drinking glass, and more particularly to a whiskey glass that in the parlance of the whiskey trade is known as a "shot" glass. The invention consists in certain new and useful improvements in the mold apparatus employed in the production of "shot" glasses.

The invention will be understood by reference to accompanying drawings in which:

Figure I is a view partly in vertical section and partly in side elevation of mold apparatus which in an exemplary way embodies the invention. The mold parts are shown in closed or glass-shaping position; and Figure II is a view of two of the glasses formed in the mold apparatus.

Referring to the drawing, the "shot" glasses G are formed in a mold apparatus that includes a mold 1, into which gobs of glass in semi-molten or plastic condition are successively introduced and shaped. The apparatus includes a plunger 2 that is vertically reciprocated between glass-shaping position in the matrix 3 of the mold, and a position above the mold, to permit by the vertical rise of an ejector 4 the removal of the shaped glass article and the introduction of a gob of plastic glass for the next-ensuing molding operation. The machine in which our improved mold apparatus, or a plurality of them, is organized, and in which the plunger 2 and ejector 4 are operated, is not an immediate concern of this invention, and hence such machine has not been illustrated herein. Suffice it to say that our mold apparatus may be organized in a pressing or molding machine of the type illustrated and described in prior Patent No. 2,064,624, granted December 15, 1936, to J. W. Napier, or in prior Patent No. 2,287,512, granted June 23, 1942, to R. P. Cassell.

The plunger 2 comprises a mandrel-like member having a shoulder 5 below which is a portion 6 of exactly the shape and volume desired in the liquid-measuring space or cavity of the "shot" glass. Above the shoulder 5 the plunger includes a portion 7 which is equipped with a plunger-embracing member or sleeve 8 whose lower edge enters the mold cavity with the glass-shaping portion of the plunger and fashions the rim of the "shot" glass. The sleeve member is mounted on stems 9 slidably secured in a rigid collar 10 on the plunger, and is adapted to move upward, as will presently appear, against the resistance of springs 11.

In producing a glass G, a gob of plastic glass is introduced to the open matrix 3 of the mold, and then the plunger is lowered. The lower end 6 of the plunger presses downward upon the body of plastic glass in the bottom of the matrix, and by displacement forces the glass upward between the side wall of the matrix and the body portions 5, 6, 7 of the plunger. As the descending plunger approaches the end of its downward stroke, the glass displaced upward in the mold matrix makes contact with the rim-shaping edge of the sleeve member 8 in the mold. Under the pressure of the upwardly displaced glass upon such edge, the sleeve portion 8 moves upward against the resistance of springs 11, until the plunger reaches the lower end of its stroke, and a "shot" glass G has been fully formed, as indicated in Figure I. The plunger is then elevated, leaving the shaped article G in the matrix of the mold. By this time the plastic glass will have so far congealed or solidified that the article is capable of retaining its shape, whereby, as the ejector 4 is elevated (as in fact it is) into the mold and caused to thrust the article upward from the matrix 3, the body of the article is self sustaining. Upon being removed from the mold, the shaped article is carried to an annealing lehr and processed in usual manner.

It will be understood that such variation as may exist in the quantity of glass in the successive gobs of glass introduced to the mold will not affect the volumetric capacity of the measuring cavities 60 (Figure II) of the glasses G, but such variation will be reflected in the height of the lips 70 above such cavities, since the yielding sleeve member always adjusts its vertical position in the mold in precise accordance with the volume of glass pressed in the mold. Below the shoulder 50—which is in this case a circumferentially continuous shoulder—the cavity within each and every glass is of exactly predetermined volume, while the extent of the lip 70 above such shoulder minutely varies from glass to glass in accordance with the variation in the quantity of glass in the gobs. Thus, the measuring cavities of all of the glasses produced will be of exactly uniform volume.

In service a glass G will be filled only to the shoulder 50, and, due to the fact that there is a confining lip 70 above such shoulder, the liquor dispenser may pour to the top of the measuring cavity without fear of overflow and loss of some of the liquor. This will provide for accurate measuring of liquor without danger of overflow and waste. And additionally the lip 70 above the measuring recess or cavity simplifies drinking from the glass or pouring from the glass without spilling.

It will be perceived that our mold apparatus is of extremely simple construction. The mold 1 comprises a one-piece body of metal in which the matrix is formed, whereby the use of a two-part mold is avoided, and the need of opening and closing the mold sections during each glass-forming operation is eliminated.

The subject of this invention will find utility in other fields than that in which we have described it, and the appended claims will be read in this light. Various refinements or modifications in the structures disclosed may be developed and employed without departing from the spirit of the invention defined.

We claim as our invention:

1. In apparatus of the class described comprising a mold having a matrix in the form of the exterior of a measuring and drinking glass to be produced from a gob of glass in plastic condition, a plunger adapted to enter said mold to form the interior chamber of the glass, and a sleeve snugly encircling said plunger and mounted for yielding movement axially thereof; the invention herein described comprising a circumferential shoulder on said plunger, the body of the plunger below said shoulder being exactly of the shape and volume desired in the liquid-measuring chamber of the glass produced, said yieldingly mounted sleeve being arranged on the body of the plunger above said shoulder and adapted to enter and slidably engage the wall of the matrix, whereby said sleeve and the body of the plunger above said shoulder cooperate with the wall of said matrix to form an outwardly offset wall portion and lip on said glass above said liquid-measuring chamber, the so-arranged sleeve being automatically slidable upon the wall of the mold matrix during the molding operation, to vary the extent of said offset wall portion above said liquid-measuring chamber according as the quantity of plastic glass in the gob introduced to and shaped in said mold varies from normal.

2. In molding apparatus comprising a mold having a matrix adapted to receive and externally shape a charge of moldable material, a mold plunger having a body portion adapted to enter said matrix, a plunger-embracing member, and means for mounting such member for axial movement relatively to said plunger; the invention herein described wherein said plunger has an offset shoulder arranged medially of the body portion thereof which enters said matrix, and said plunger-embracing member having a portion adapted to enter and slidably engage the surface of the wall of said matrix in position of material-shaping cooperation with said matrix and plunger, with permissive variation in the interval between the shoulder on said plunger and the matrix-entering portion of said member in molding position in said matrix.

CHARLES H. LYSLE.
JAMES M. GUTHRIE.

REFERENCES CITED

The following references are of record in the file of this patent:

UNITED STATES PATENTS

| Number | Name | Date |
|---|---|---|
| 85,203 | Boggs | Dec. 22, 1868 |
| 265,300 | Atterbury | Oct. 3, 1882 |
| 646,948 | Brookfield et al. | Apr. 10, 1900 |
| 804,069 | Strub | Nov. 7, 1905 |
| 862,466 | First | Aug. 6, 1907 |
| 907,386 | Meeker | Dec. 22, 1908 |
| 2,210,583 | Henry | Aug. 6, 1940 |

FOREIGN PATENTS

| Number | Country | Date |
|---|---|---|
| 1,994 | Great Britain | A. D. 1866 |